US009356500B2

(12) United States Patent
Furlan et al.

(10) Patent No.: US 9,356,500 B2
(45) Date of Patent: May 31, 2016

(54) STEPPER MOTOR WITH ADJUSTABLE DETENT TORQUE

(71) Applicant: Johnson Electric S.A., Murten (CH)

(72) Inventors: Miha Furlan, Bern (CH); Yvan Bourqui, Corminboeuf (CH)

(73) Assignee: JOHNSON ELECTRIC S.A., Murten (CH)

( * ) Notice: Subject to any disclaimer, the term of this patent is extended or adjusted under 35 U.S.C. 154(b) by 452 days.

(21) Appl. No.: 13/868,662

(22) Filed: Apr. 23, 2013

(65) Prior Publication Data
US 2013/0278086 A1 Oct. 24, 2013

(30) Foreign Application Priority Data

Apr. 23, 2012 (CN) .......................... 2012 1 0121442

(51) Int. Cl.
*H02K 37/12* (2006.01)
*H02K 15/03* (2006.01)
*H02K 7/06* (2006.01)
*H02K 37/14* (2006.01)
*H02K 7/106* (2006.01)

(52) U.S. Cl.
CPC .................. *H02K 37/12* (2013.01); *H02K 7/06* (2013.01); *H02K 7/106* (2013.01); *H02K 15/03* (2013.01); *H02K 37/14* (2013.01); *Y10T 29/49012* (2015.01)

(58) Field of Classification Search
CPC ......... H02K 15/03; H02K 37/12; H02K 7/06; H02K 37/14; H02K 7/106; Y10T 29/49012
USPC .......................................... 310/49.55; 29/598
See application file for complete search history.

(56) References Cited

U.S. PATENT DOCUMENTS

| 3,950,663 | A | * | 4/1976 | Mead .......................... 310/49.19 |
| 4,127,802 | A | * | 11/1978 | Johnson ....................... 318/696 |
| 4,207,483 | A | * | 6/1980 | Baer ........................... 310/49.07 |
| 4,381,465 | A | * | 4/1983 | Renkl et al. ................. 310/49.12 |
| 4,884,333 | A | * | 12/1989 | Cooper et al. .................. 29/596 |
| 6,479,911 | B1 | * | 11/2002 | Koike et al. ................. 310/49.24 |
| 6,753,632 | B1 |   | 6/2004 | Hartsfield, Jr. |
| 7,348,698 | B2 | * | 3/2008 | Ohta et al. ...................... 310/80 |
| 7,378,768 | B2 | * | 5/2008 | Ohkawa et al. .................. 310/71 |
| 7,821,177 | B2 | * | 10/2010 | Onimaru et al. ....... 310/216.129 |
| 2002/0101120 | A1 | * | 8/2002 | Akama et al. ............... 310/49 R |
| 2008/0211355 | A1 | * | 9/2008 | Sakamoto et al. .......... 310/49 R |
| 2011/0043074 | A1 | * | 2/2011 | Matsuno et al. .............. 310/257 |
| 2011/0132115 | A1 | * | 6/2011 | Lee ............................... 74/89.37 |

FOREIGN PATENT DOCUMENTS

EP          0689278 A1    12/1995

* cited by examiner

*Primary Examiner* — Alex W Mok
(74) *Attorney, Agent, or Firm* — Muncy, Geissler, Olds & Lowe, P.C.

(57) ABSTRACT

A stepper motor has a rotor having a permanent magnet, a stator housing and a plurality of stator coil assemblies disposed within the stator housing. Each coil assembly has a bobbin, a coil wound about the bobbin, and two pole plates having pole fingers extending axially inside of the bobbin. The bobbin is disposed between the two pole plates and defines a space accommodating the rotor. A number of magnetic detent plates are disposed about the permanent magnet rotor. Each magnetic detent plate has a central opening accommodating the rotor and a plurality of projections extending inwardly, spaced about the central opening. The projections interact with the magnetic field of the rotor magnet.

16 Claims, 3 Drawing Sheets

STEPPER MOTOR WITH ADJUSTABLE DETENT TORQUE

CROSS-REFERENCE TO RELATED APPLICATIONS

This non-provisional patent application claims priority under 35 U.S.C. §119(a) from Patent Application No. 201210121442.2 filed in The People's Republic of China on Apr. 23, 2012.

FIELD OF THE INVENTION

This invention relates to an electric motor and in particular, to a stepper motor having an adjustable detent torque.

BACKGROUND OF THE INVENTION

Magnetic detent torque in a motor may be desired in order to hold the position of the rotor when the motor is not operating (turned off). The detent torque effect is the attraction between the magnets and the stator poles when at rest (no current flowing), and is due to position dependent magnetic flux induced by a permanent magnetization. This is particularly advantageous when the motor forms part of an actuator.

European patent EP0689278 describes the idea of creating a detent torque generated by additional structures on the stator parts.

U.S. Pat. No. 6,753,632 describes how to achieve controlled detent torque by modifying the geometry of the magnet poles.

Both methods suffer from the problem that once the geometry has been fixed and the motor is produced, one cannot change the detent torque without changing the whole manufacturing process.

SUMMARY OF THE INVENTION

Hence there is a desire for a motor or actuator, such as a stepper motor, in which the detent torque can be adjusted during manufacture without needing to redesign the entire motor or actuator.

This is achieved through the use of magnetic detent plates which are arranged to increase the detent torque to a desired level. The magnetic detent plates may also be used to bias the rotor to a predetermined desired resting orientation with respect to the stator.

Accordingly, in one aspect thereof, the present invention provides a stepper motor comprising: a rotor having a permanent magnet; a stator housing; a plurality of stator coil assemblies disposed within the stator housing; and a number of magnetic detent plates disposed along the motor axis, wherein each magnetic detent plate has a central opening accommodating the permanent magnet of the rotor and a plurality of projections extending inwardly, spaced about the central opening, the projections interacting with the magnetic field of the permanent magnet of the rotor.

Preferably, each coil assembly has a bobbin, a coil wound about the bobbin, and two pole plates having pole fingers extending axially inside of the bobbin, the bobbin being disposed between the two pole plates and defining a space accommodating the rotor.

Preferably, the magnetic detent plates are disposed between two adjacent stator coil assemblies.

Preferably, each magnetic detent plate has at least one locking tab and the housing as at least one corresponding aperture accommodating the locking tab to fix the orientation of the magnetic detent plates with respect to the stator housing.

Preferably, the number of projections on each magnetic detent plate is equal to the number of poles of the rotor magnet.

Preferably, the housing comprises two housing pieces and each housing piece has a number of cut outs forming apertures in the housing, and each pole plate has a number of locking tabs received in the apertures to fix the circumferential and axial positions of the pole plates with respect to the stator housing.

Preferably, at least one of the outer pole plates has mounting lugs extending from two of the locking tabs.

Preferably, each bobbin has a contact block formed on one of the flanges, the contact block being arranged to extend through one of the apertures in the stator housing, and two contact pins are fixed to the contact block so as to extend away from the stator housing, ends of the coil being terminated on the contact pins.

Preferably, the number of phases is two.

According to a second aspect thereof, the present invention also provides a method of making a stepper motor, comprising the steps of: disposing a number of stator coil assemblies about a permanent magnet rotor; fitting the stator coil assemblies to a housing; selecting a number of magnetic detent plates, each with a plurality of projections; and disposing the magnetic detent plates in the housing about the rotor, such that the projections engage the magnetic field of the rotor.

Preferably, the stepper motor comprises at least two stator coil assemblies and the magnetic detent plates are disposed between two adjacent coil assemblies.

Preferably, the step of selecting a number of magnetic detent plates includes determining the detent torque required for the motor, and selecting the number of magnetic detent plates required to achieve the required detent torque.

Preferably, the step of selecting the number of magnetic detent plates includes determining the detent torque required for the motor, and selecting the number and thickness of the magnetic detent plates required to achieve the required detent torque.

Preferably, the step of determining the number of magnetic detent plates required includes determining the size of the projections, the shape of the projections, the number of projections and the location of the projections.

Preferably, the step of determining the size of projections includes determining the thickness of the magnetic detent plates.

Preferably, the step of providing a number of magnetic detent plates, includes determining the number of magnetic detent plates required to be provided based on the required detent torque, the number of projections, the size of the projections, the shape of the projections, the thickness of the magnetic detent plates and the location of the projections with respect to the rotor magnet.

According to a second aspect thereof, the present invention provides a linear actuator incorporating a stepper motor as described above and an output shaft, wherein the output shaft is connected to the rotor of the stepper motor with screw threads.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
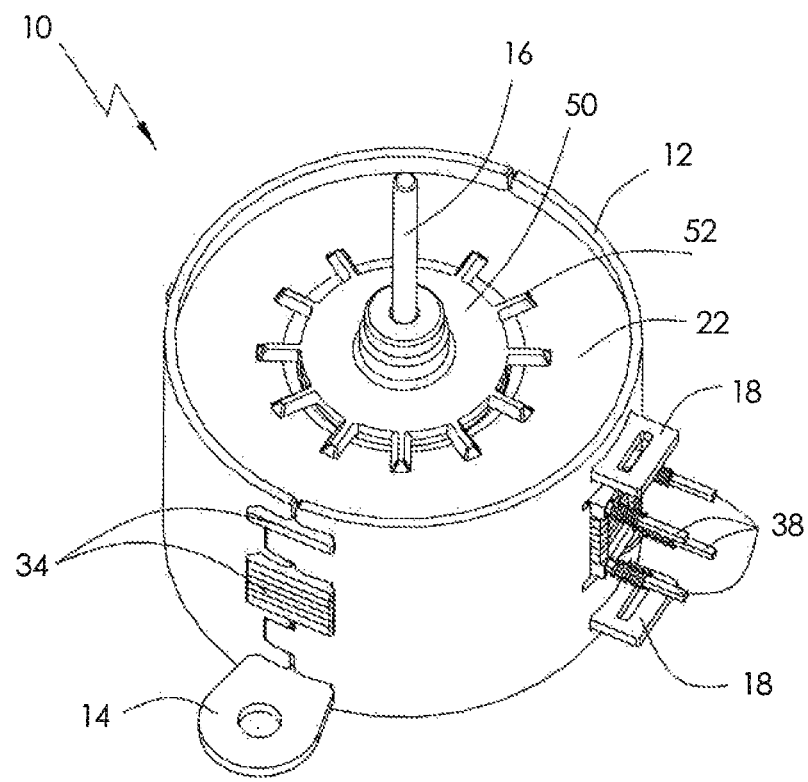
FIG. 1 illustrates a stepper motor according to a preferred embodiment of the present invention.
Figure 2:
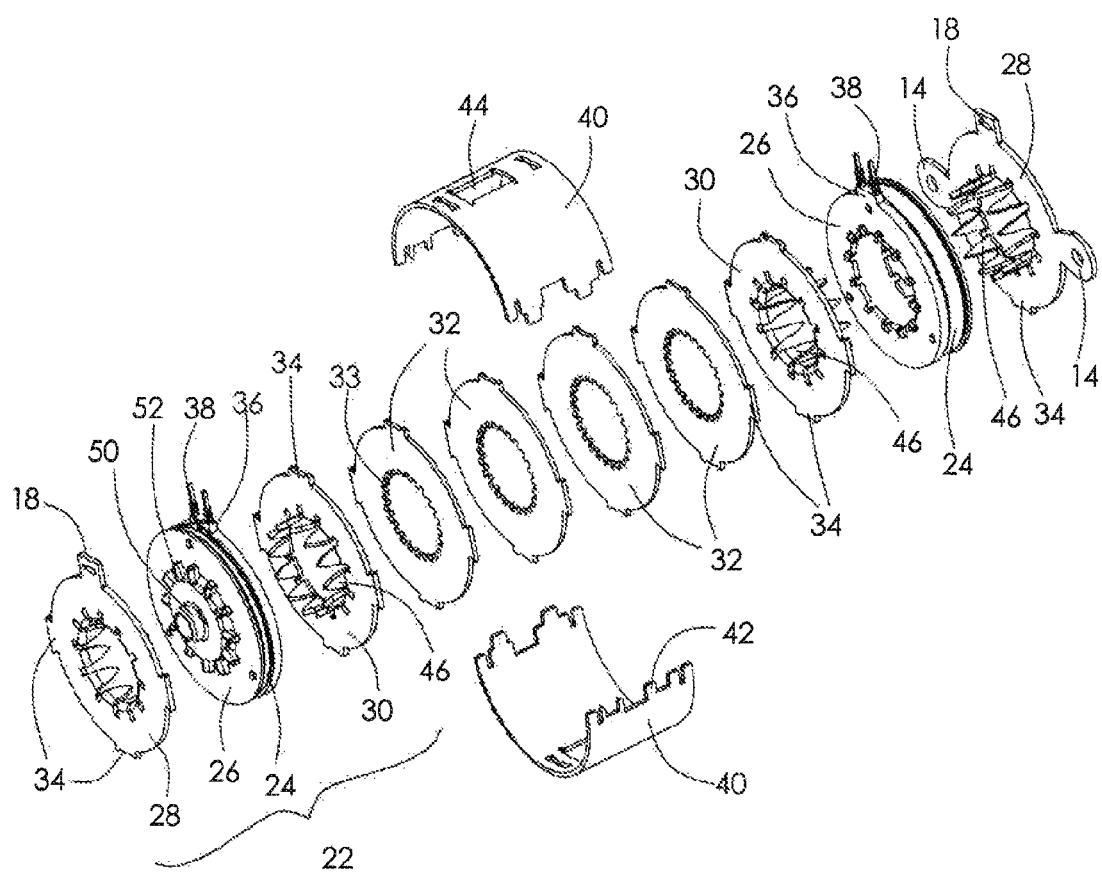
FIG. 2 is an exploded view of the stator of the motor of FIG. 1.

FIGS. 1 & 2 illustrate the preferred embodiment of a stepper motor 10 according to the present invention. FIG. 1 shows the full motor in the assembled condition. FIG. 2 is an exploded view of the stator only, i.e. the rotor has been omitted.

As shown, the stepper motor has a stator and a rotor. Only the shaft 16 of the rotor is visible in FIG. 1, with the body of the rotor being accommodated within the stator. The rotor, as is conventional, comprises a shaft with a permanent magnet, preferable a ring magnet, fixed to the shaft by a rotor core.

The stator comprises a housing 12, two coil assemblies 22, and a number of magnetic detent plates 32 separating the two coil assemblies. Each coil assembly comprises a stator coil 24 wound on a bobbin 26, an outer pole plate 28, and an inner pole plate 30. Optionally, the stator housing 12 is formed by two pieces 40 which are joined together in a clam shell arrangement. Each housing piece is formed from a rectangular piece of magnetically conductive sheet material (such as sheet electrical steel) and cut to shape by stamping and then rolled to form a semicircular ring. Preferably, each housing piece is identical. The circumferential ends 42 of the housing pieces have complementary mating shapes arranged to be locked together to form a complete ring. Each piece also has a number of cutouts 44 arranged to receive locking tabs 34, preferably by press fitting, of the outer pole plates 28, inner pole plates 30 and magnetic detent plates 32 and contact blocks 36 of the bobbins of the stator coils that support contact pins 38 on which the stator coils 24 are terminated.

The outer pole plates 28 and the inner pole plates 30 have axially extending pole fingers 46 which interleave so as to be alternately disposed circumferentially within their respective coil and within the air gap formed between the coils and the rotor magnet. Being plates they are stamped from flat sheet material, similar to the housing pieces with the pole fingers 46 being bent to extend axially as part of the stamping operation. Thus the construction of these parts is easy and precise. One or both of the outer pole plates 28 may be provided with mounting lugs 14 formed as an extension of the locking tabs 34 with a hole formed therein to accept a bolt or screw for fixing the motor to a substrate or base.

The stator coil assemblies are of identical construction. Each stator coil assembly comprises a bobbin 26 and a coil 24 wound about the bobbin. The bobbin has two flanges separated by a cylindrical portion. The coil, is wound about the cylindrical portion between the flanges. The coil is terminated on two pins 38, forming the motor terminals, which are fixed to the contact block 36 formed on one of the flanges so as to project laterally of the bobbin. The bobbin 26 also has a central space defined by the cylindrical portion which accommodates the rotor. One end of the central opening is closed by a bearing boss 50 which is integrally connected to one flange by a plurality of ribs 52 which fit into corresponding slots in the outer pole plate between the pole fingers for the purpose of alignment. Similar ribs are arranged on the other end of the bobbin in order to fit into corresponding slots in the inner pole plate. The bearing boss may support a bearing or may form a bearing for rotatably supporting the rotor shaft.

Figure 3:
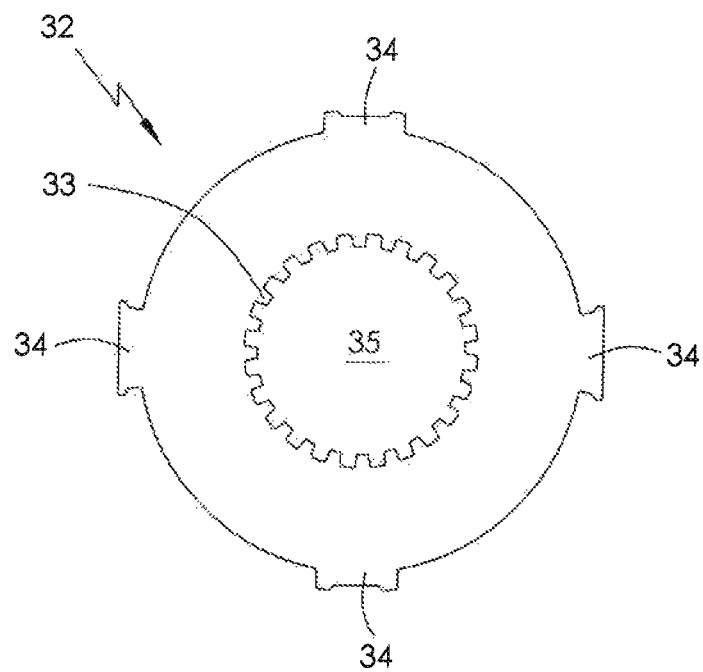
FIG. 3 is an enlarged view of a magnetic detent plate being a part of the stator of FIG. 2.

The magnetic detent plates 32 are disposed between the first and second inner pole plates 30. Each magnetic detent plate, as shown in FIG. 3, has a central opening 35 to accommodate the rotor. The central opening has a plurality of inwardly extending, preferably radially inwardly extending projections 33. These projections are arranged to attract respective magnetic poles of the rotor magnet to provide a predetermined level of detent torque. Projections 33 may be modified to change the location of the rest position of the rotor when the motor is not operating. The size of the projections 33 may also be modified to change the strength of the holding force or detent torque. The size of the projections may be changed by changing the shape of the projections on each magnetic detent plate, by changing the thickness of each magnetic detent plate or by changing the number of magnetic detent plates or by combinations of these changes.

Optionally, each of the outer pole plates 28, inner pole plates 30 and magnetic detent plates 32 have four locking tabs 34. During assembly, the first coil 24 and bobbin 26 is placed between the first outer pole plate 28 and the first inner pole plate 30 to form the first coil assembly 22. The second coil 24 and bobbin 26 is placed between the second outer pole plate 28 and the second inner pole plate 30 to form the second coil assembly 22. The required number of magnetic detent plates 32 are placed directly between the first and second inner pole plates so as to be sandwiched between the two coil assemblies 22. With the locking tabs aligned, the two housing pieces 40 are fitted to the stacked assembly. The locking tabs 34 extend through the corresponding cut outs 44 in the housing so as to rigidly hold the parts together. Specifically, the locking tabs 34 of the inner pole plates 30 and the magnetic detent plates 32 together with the contact blocks 36 of the bobbins extend through the central cutout of one of the housing pieces.

The central cutout of the other housing piece accommodates the locking tabs 34 of the inner pole plates 30 and the magnetic detent plates 32 as the bobbins have only one contact block 36 for the contact pins 38. The corresponding locking tabs 34 of the two outer pole plates 28 are received or extend through respective cutouts 44 in each housing piece. The remaining locking tabs 34, which are spaced by 90 degrees from the locking tabs disposed in the central cutouts, are received in apertures formed by cutouts in the circumferential edges of the housing pieces. Again, the locking tabs of the two outer pole plates are received in dedicated openings.

Once the two housing pieces have been fitted to the stacked components and their ends mated, they are fixed together, either by plastic deformation to form interlocking parts or by welding. The plates and coils are thus held tightly together by the housing with the locking tabs fixing the axial and circumferential alignment of the plates and coils with the housing and the housing and outer edges of the plates and bobbins fixing the radial positioning, ensuring precise concentricity.

Optionally, each outer pole plate has a connector lug 18 for fixation of a connector (not shown) to support the motor terminal pins 38.

During manufacture of the stepper motor, each bobbin is wound with a stator coil which is terminated on the motor terminal pins. Each bobbin is sandwiched between two pole plates to form a stator coil assembly. The two pole plates may be an inner pole plate and an outer pole plate. Although they are essentially identical, the outer pole plate may have mounting lugs 14 for mounting the motor and a connector lug 18 for mounting an external connector for supporting the motor terminal pins 38. The two coil assemblies are fitted to the stator housing by placing them between the two clam shell halves of the housing with the tabs 34 engaging with the cutouts of the housing.

Between the stator coil assemblies, a number of magnetic detent plates are disposed so as to interact with the magnetic field of the rotor when the motor is not operating, so as to magnetically bias of hold the rotor in a predetermined orientation with respect to the stator. That is, to provide a magnetic holding force on the rotor.

The rotor is fitted to the coil assemblies and the magnetic detent plates before the housing is fitted to the coil assemblies. The shaft 16 of the rotor is fitted to the bearings of the bearing bosses 50 of each of the coil assemblies.

Embodiments of the present invention allow the easy manufacture of a stepper motor that has an adjustable detent torque. By adjustable, we mean that during construction of the motor, the final detent torque can be adjusted to the desired level by the selection of the appropriate number and design of simple magnetic detent plates without changing the other parts of the motor. Of course, by changing the number or thickness of the magnetic detent plates, spacers may be needed to maintain the axial length of the stator constant.

Thus, as can be seen from the above description, it is possible to create a stepper motor with a desired holding force or detent torque which is virtually unaffected by temperature or wear. Indeed, the detent torque can be selected or predetermined by using a different number of magnetic detent sheets or by changing the thickness of the magnetic detent sheets, without changing other stator parts or the rotor geometry. The location of the holding positions can be arbitrarily selected, independently of the poles of the stator. By appropriate design of the projections of the magnetic detent plates (their shape, number and arrangement), one can obtain the desired angular detent torque. The amplitude is set with the number and/or the thickness of the sheets. The detent torque amplitude can be change easily by using a different number (or thickness) of the magnetic detent plates.

Figure 4:
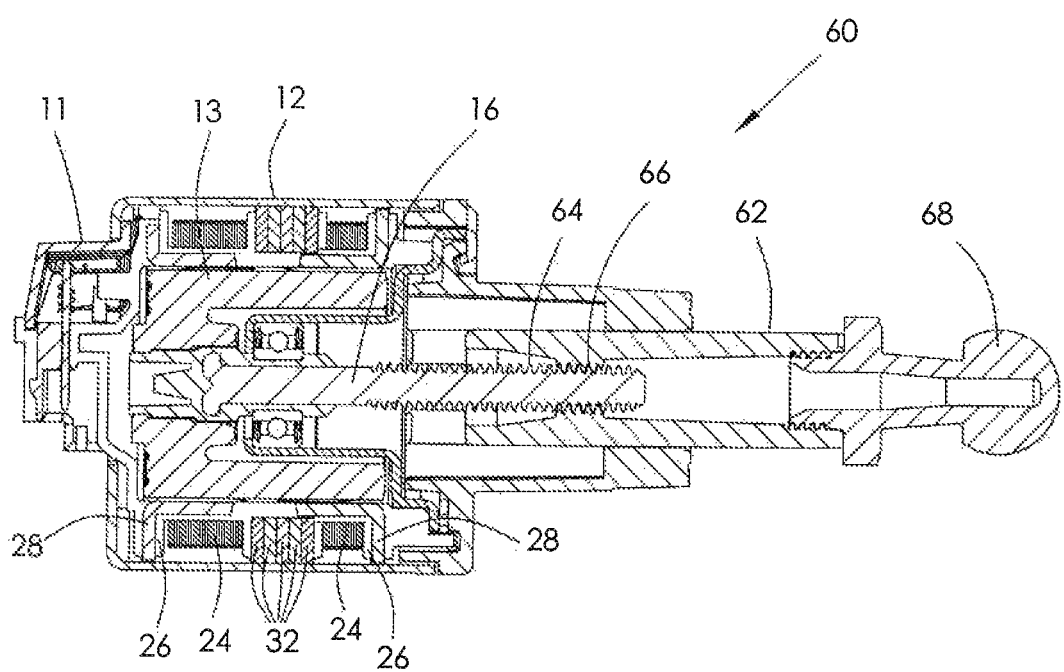
FIG. 4 is a cross section of a linear actuator according to a further embodiment of the present invention.

FIG. 4 shows another embodiment of a linear actuator 60 according to the present invention. The linear actuator 60 includes a stepper motor 11 and an output shaft 62. The stepper motor 11 is similar to the stepper motor 10 shown in FIG. 1, but differs in that, the motor shaft 16 of the rotor 13 has a screw thread 64 which engages a screw thread 66 of the output shaft 62. The output shaft 62 is arranged so as to be movable in the direction of the motor axis but is not able to rotate about the axis. Thus as the rotor 13 rotates, the motor shaft 16 rotates causing the output shaft 62 to move in the axial direction. Attached to the end of the output shaft 62 is a coupler 68 adapted to mate with an object to be moved by the linear actuator 60, such as a head lamp or an external mirror of a vehicle. Similarly, the stepper motor 11 has a detent torque which can be easily adjusted, such that the linear actuator 60 can be easily created with a desired holding force to hold the object in place, once positioned, without the stepper motor being energized.

In the description and claims of the present application, each of the verbs "comprise". "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the embodiment described has two stator coil assemblies and is thus designed as a two phase motor. The invention may be used with any desired number of phases by adding additional stator coil assemblies, with or without additional magnetic detent plates disposed between adjacent coil assemblies. Alternatively, a single phase motor can be produced by deleting one of the stator coil assemblies as long as the or each magnetic detent plate interacts with the magnetic field of the rotor.

Furthermore, it is clear that the location of the magnetic detent plates is not only limited to positions between two stator phases. Magnetic detent plates can be disposed or distributed anywhere axially along the motor and about the permanent magnet rotor where they magnetically interact with the latter. For example, they can be disposed at the outer axial ends of the motor adjacent to the outer pole plates 28.

The invention claimed is:

1. A stepper motor comprising:
   a rotor having a permanent magnet;
   a stator housing;
   a plurality of stator coil assemblies disposed within the stator housing; and
   a number of magnetic detent plates disposed along the motor axis,
   wherein each magnetic detent plate has a central opening accommodating the rotor and the permanent magnet of the rotor and a plurality of projections extending inwardly toward the rotor, spaced about the central opening, the projections interacting with the magnetic field of the permanent magnet of the rotor, and
   wherein each magnetic detent plate has at least one locking tab extending outward from a peripheral edge of the magnetic detent plate and the stator housing has at least one corresponding aperture accommodating the locking tab to fix the orientation of the magnetic detent plates with respect to the stator housing.

2. The stepper motor of claim 1, wherein each coil assembly has a bobbin, a coil wound about the bobbin, and two pole plates having pole fingers extending axially inside of the bobbin, the bobbin being disposed between the two pole plates and defining a space accommodating the rotor.

3. The stepper motor of claim 2, wherein the stator housing comprises two housing pieces and each housing piece has a number of cut outs forming apertures in the housing, and each pole plate has a number of locking tabs received in the apertures to fix the circumferential and axial positions of the pole plates with respect to the stator housing.

4. The stepper motor of claim 3, wherein at least one of the pole plates has mounting lugs extending from two of the locking tabs.

5. The stepper motor of claim 3, wherein each bobbin comprises: a pair of flanges; a contact block formed on one of the flanges, the contact block being arranged to extend through one of the apertures in the stator housing; and two contact pins fixed to the contact block so as to extend away from the stator housing, ends of the coil being terminated on the contact pins.

6. The stepper motor of claim 1, wherein the magnetic detent plates are disposed between two adjacent stator coil assemblies.

7. The stepper motor of claim 1, wherein the number of projections on each magnetic detent plate is equal to the number of poles of the rotor magnet.

8. The stepper motor of claim 1, wherein the number of phases is two.

9. A linear actuator comprising the stepper motor of claim 1 and an output shaft, wherein the output shaft is connected to the rotor of the stepper motor via screw threads.

10. A method of making a stepper motor, comprising the steps of:
   disposing a number of stator coil assemblies about a permanent magnet rotor;
   fitting the stator coil assemblies to a housing;
   selecting a number of magnetic detent plates, each with a plurality of projections extending toward the rotor; and
   disposing the magnetic detent plates in the housing about the rotor, such that the projections engage the magnetic field of the rotor,
   wherein each magnetic detent plate has at least one locking tab extending outward from a peripheral edge of the magnetic detent plate and the stator housing has at least one corresponding aperture accommodating the locking tab to fix the orientation of the magnetic detent plates with respect to the stator housing.

11. The method of claim 10, wherein the stepper motor comprises at least two stator coil assemblies and the magnetic detent plates are disposed between two adjacent coil assemblies.

12. The method of claim 10, wherein the step of selecting a number of magnetic detent plates includes determining the detent torque required for the motor, and selecting the number of magnetic detent plates required to achieve the required detent torque.

13. The method of claim 10, wherein the step of selecting the number of magnetic detent plates includes determining the detent torque required for the motor, and selecting the number and thickness of the magnetic detent plates required to achieve the required detent torque.

14. The method of claim 10, wherein the step of determining the number of magnetic detent plates required includes determining the size of the projections, the shape of the projections, the number of projections and the location of the projections.

15. The method of claim 14, wherein the step of determining the size of projections includes determining the thickness of the magnetic detent plates.

16. The method of claim 10, wherein the step of providing a number of magnetic detent plates, includes determining the number of magnetic detent plates required to be provided based on the required detent torque, the number of projections, the size of the projections, the shape of the projections, the thickness of the magnetic detent plates and the location of the projections with respect to the rotor magnet.

* * * * *